US012263366B2

(12) United States Patent
Cosentino

(10) Patent No.: US 12,263,366 B2
(45) Date of Patent: Apr. 1, 2025

(54) FOREST FIRE AND WILDFIRE DETECTION SYSTEM

(71) Applicant: Filadelfo Joseph Cosentino, Plano, TX (US)

(72) Inventor: Filadelfo Joseph Cosentino, Plano, TX (US)

( * ) Notice: Subject to any disclaimer, the term of this patent is extended or adjusted under 35 U.S.C. 154(b) by 358 days.

(21) Appl. No.: 17/476,428

(22) Filed: Sep. 15, 2021

(65) Prior Publication Data

US 2023/0080187 A1 Mar. 16, 2023

(51) Int. Cl.
*A62C 3/02* (2006.01)

(52) U.S. Cl.
CPC .................................. *A62C 3/0271* (2013.01)

(58) Field of Classification Search
CPC ..... A62C 3/0271; A62C 3/0292; A62C 31/28; A62C 35/13; A62C 37/36; A62C 37/38; A62C 37/40
See application file for complete search history.

(56) References Cited

U.S. PATENT DOCUMENTS

| | | | | | |
|---|---|---|---|---|---|
| 4,484,690 | A * | 11/1984 | Nash | H05K 5/06 55/491 |
| 2017/0113079 | A1* | 4/2017 | Thomsen | A62C 3/0292 |
| 2019/0175965 | A1* | 6/2019 | Huefner | A62C 3/0214 |
| 2019/0242390 | A1* | 8/2019 | Flaster | F04D 25/0673 |
| 2019/0299038 | A1* | 10/2019 | Hernandez | B05B 9/007 |
| 2020/0348446 | A1* | 11/2020 | Tremsin | G01V 8/005 |

* cited by examiner

*Primary Examiner* — Christopher R Dandridge
(74) *Attorney, Agent, or Firm* — Kirby Drake

(57) ABSTRACT

This "Wildfire, Forest Fire and Detection System," herein referred to "Wildfire," will use a combination or existing "on the shelf" technologies for specific use of detecting fires, forest fires, and wildfire by sampling the air for both smoke with both ionization and/or photoelectric smoke detector technologies and a temperature sensor in an outdoor enclosure distributed across a grid of forest, woodlands, prairie, and fire prone areas to detect presence of combusting ions and/or smoke that may signify a potential fire source or fire in progress. The system will use telemetry or cellemetry, to a satellite or cellular/wireless network to notify Command, Control and Dispatch of a fire potential long before the forest is ablaze leading to a wildfire. Smoldering embers and small fires can be more easily be extinguished by dispatching a small crew or water drop by aircraft log before the forest is burning. Wildfire will locate, and detect the direction and speed of the burn.

THE WILDFIRE SYSTEM WILL USE A COMBINATION OF TECHNOLOGIES THAT WILL DETECT SMOKE, COMBUSTION IONS, AND INCREASED TEMPERATURE OF EACH STATION STATIONS WITH TRIANGULATION LOCATION BY DISTRIBUTED STATIONS WITHIN THE FIRE PRONE AREAS TO THE COMMAND CONTROL CENTER OF POTENTIAL SMOLDERING EMBERS, SMOKE, OR FIRE LONG BEFORE THE FIRE PRONE AREA IS ABLAZE AND OUT OF CONTROL. THE SYSTEM WILL DETECT THE LOCATION OF THE BURN BY TRIANGULATION, THE DIRECTION OF THE BURN, AND SPEED OF THE BURN.

6 Claims, 3 Drawing Sheets

Graphic Representation
Wildfire Communication Network

Graphic Representation
Wildfire Station Components and Technologies Employed.

Graphic Representation
Wildfire Communication Network

Graphic Representation
Wildfire Triangulation and Early Remediation

FOREST FIRE AND WILDFIRE DETECTION SYSTEM

FIELD

This System uses a combination of diverse technologies with "on the shelf hardware, technology, and equipment" for specific use to detect remote, forest, wilderness of fire, smoldering embers, and smoke long before there is a forest, prairie, or wild fire.

BACKGROUND

The world is experiencing more and larger wildfires that consume thousands of acres of forest, prairie and private land eat year across the glove with most notoriety in California, Australia, and the tropical forest and woodlands across the globe causing destruction of the natural habitat, wildlife, homes, and human lives. In addition to the destruction of nature and lives, homes and personal property is destroyed costing billions of dollars in loss of property, livestock, fire fighting personnel and equipment, disaster aid, and insurance claims. However the Wildfire system will notify the Command Control that there are smoldering embers, smoke, or flame long before there the area is ablaze, and can be easily contained and extinguished, thus averting a forest, prairie, or wild fire.

Upon Detection of combusting ions, smoke and/or sudden increase of temperature, an alert will be given to the Command Center that the there is probable fire detected with triangulation location detected of a probable smolder or fire for immediate response and indicating action is needed to contain and/or extinguish the source long before the area is a blazing fire.

SUMMARY

The use of this combination of existing proven technology for this specific application is unique, novel, an improvement, not obvious, or statuary in the application for this use as previously discussed in this document by using the technology in combination to detect smoldering embers, smoke, small fires, and/or sudden temperature increase. The combination of the technologies are useful in early warning of potential fires in wooded areas, prairie, fire prone areas and remote buildings, grain storage, national parks, woodlands and privately owned forests and grasslands.

The embodiment can be individual existing proven hardware and technologies currently available. It can be cluttered together into a self contained weather proof "box" using a satellite and/or cell phone telemetry or cellemetry in a self contained unit comprised of a ionization detector detecting flame ions, photoelectric sensory detecting smoke, and temperature sensor, battery, small solar pane and battery chartering unit to charge the rechargeable battery, and a standard satellite telemetry or cellular cellemetry transmitting device for monitoring. The central command will collected monitor all of the reporting stations. If there is an indication of an impending smolder or fire, and alert will be sent to the central command to triangulate the issue for immediate rapid response to the most probable triangulation location for immediate remediation.

This device is a new and novel use of flame, smoke, and heat sensing hardware currently used for in-building and home fire detection to an outdoor application primarily, but not limited to rural, barns, remote building s and storage, grain storage, forest, woodlands, and remote wilderness in the prevention of forest fires and wildfires caused by lightning, careless people, or arson.

The use of ionizing flame detectors, photoelectric smoke detectors, temperature sensors, telemetry, solar cells, cellemetry, and rechargeable battery technology is already proven technology and is not addressed in this patent.

This system is scalable to for implementation per the parameters established for controllable burn ranging for one station per every acre to mile(s). For example, there are 33 million acres of forest including 19 million acres of managed forest by the USDA Forest Service and the USDI Bureau of Land Management and National Park Service in the state of California, herein called "land management," can set the parameters of what is allowable burn before intervention is required. Ideally, there should be 1 detector every acre of a fireproof area with immediate response to extinguish a fire.

Each station can be mounted on a steel pole, tree, or big place to detect flaming ions, smoke, and increased temperature, but be able to receive sunlight to the solar panel of each station. In addition to ionization, smoke detection, and heat sensing components, a remote camera can be added for additional visual verification, as well as remote surveillance of forest, human use, wildlife management and tracking, and visual conditions of the forest, or wilderness.

BRIEF DESCRIPTION OF THE DRAWINGS

The invention will be better understood and objects other than those set forth will become apparent when consideration is given to the following detailed description thereof. Such the description makes reference to the annexed drawing within.

DETAILED DESCRIPTION

In the following detailed description, the device embodies the combination of three major existing and proven technologies for a specific and unique use and application that is unique, novel, not obvious, not statuary, improvement in the application for this use to detect fire with combustion ions, smoke by photoelectric, and heat detecting devices vis either telemetry, cellemetry, and wireless monitor detection for outdoor, rural, forested areas, and wilderness applications.

The Central Command can be any CPU or computing device, mobile phone, tablet, etc. to monitor each deployed station embodying in the Wildfire system, to detect flame, smoke, heat, or video to issue an alarm for a probable fire for remediation, and triangulate exact location based of the area of concern with triangulation with probable location from the stations with an alarm status, showing direction and speed of the burn.

Fire alarm detection technology is typically used only for in building and in home use, and either ionization detection of flame, or photoelectric detecting smoke. The Wildfire station combines both technologies to detect a smolder or burn, in addition to a heat benson to indicate a sudden increase in heat, and an optional mini camera to get a visual of the area of concern. The top of the container will use a solar cell to recharge the rechargeable batteries powering the unit.

The use of the diverse technologies are for wide area deployment to detect flame, smoke, and heat of a smolder or flame for outdoors, rural wide area, forest, and wilderness is unique, not obvious, not statuary, and not used for wide area fire detection and location. The deployment spacing can be determined by the authority having jurisdiction for land management for early detection of an impending flame or burn. Firefighters can locate the fire for early remediation, and can determine the direction and speed of the flame for early remediation The use of the wireless technology, both telemetry or cellemetry, for actual or potential forest fire and wildfire detection of remote areas and wilderness is also unique, novel, not obvious, and not statutory.

Since the existing technologies are proven and ubiquitous, they will not be described in detail in this document, but only their functionality will be referred for the Wildfire station application.

Figure 1:
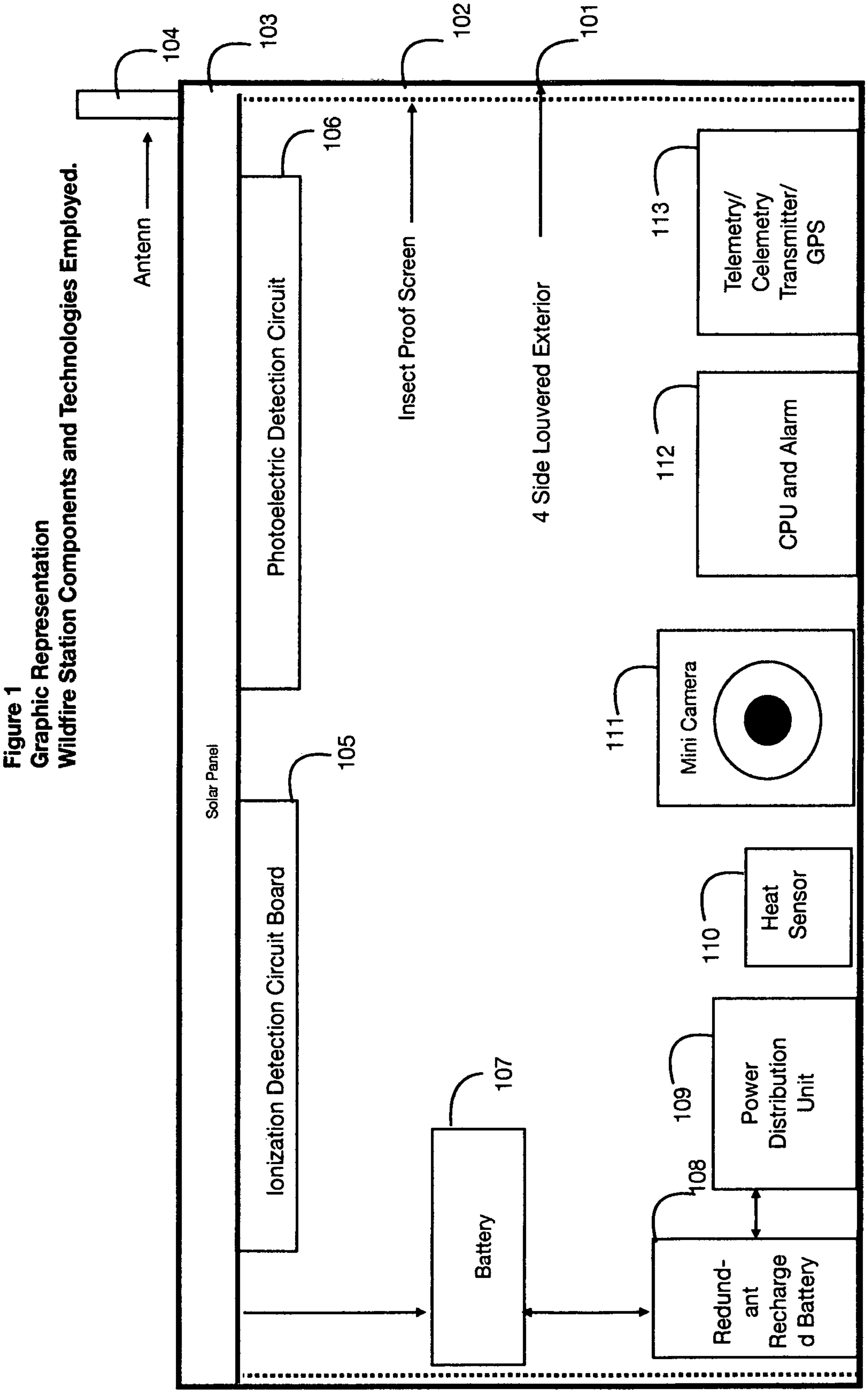
FIG. 1 is a Graphic Representation of the Functional Hardware Design Architecture of the Wildfire Station and components of the integrated technologies and device embodied and carrying out the method of the invention.

FIG. 1 is a graphic representation of the Wildfire station. Each Wildfire station will consist of a louvered metal outdoor louvered enclosure 101 to allow ambient air inside to detect flame, smoke, and heat. A metal or synthetic screen 102 will be an insect, animal, and debris barrier.

The top of the Wildfire station will have a solar panel 103 to gather sunlight to keep the redundant batteries 108 recharged through the battery charger 107. The power will be brought to a PDU (Power Distribution Unit) to power the Ionization Detection Circuit Board 105, Photoelectric Detection Circuit Board, heat sensor 110, optional mini camera 111 CPU and Warm Panel 112, and transmitter 113.

The PDU 109 will connect to the CPU and Alarm Panel 112 to monitor the battery condition to the Central Command and Dispatch. The heat sensor 110, Ionization Detection Circuit Board 105, Photoelectric Circuit Board 106, and Mini-camera 111 will also be connected to the CPU and Alarm Panel 112.

The CPU and Alarm Panel 113 will connect to the Telemetry/Cellemety Transmitter 113 to transmit the alarm signals via the antenna 104 to either, or both satellite and/or wireless network to the Command and Control Dispatch center to be monitored.

Figure 2:
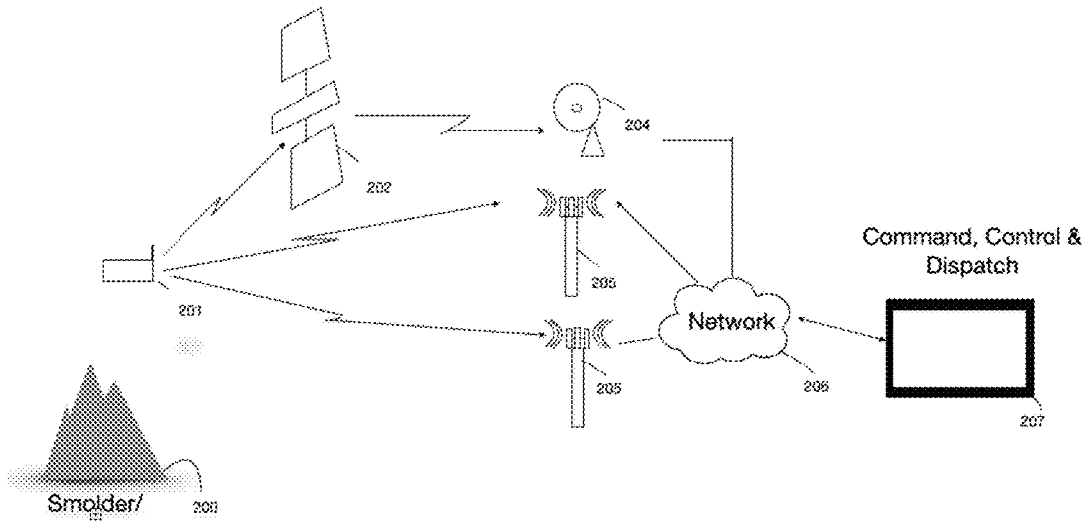
FIG. 2 is a Graphic Representation of each Wildfire connect to the Command, Control, and DispatchCenter via satellite telemetry, or wireless networks, either public or private.

FIG. 2 is graphic representation of the Wildfire Communications Network. Each station 201 will monitor the ambient air for smoke, flame, heat and/or visual view of the designated vicinity. If there is any indication of a smolder or fire 200, the Wildfire station 201 will transmit the detection signal to the Command, Control and Dispatch computing device for immediate remediation. The single can be transmitted to either satellite 202 to EarthStation 204 to the Network 206 and ultimately to the Command, Control, and Dispatch center 207. Alternately, or both, the signal can also be transmitted to one or more cellular towers 205 to the network 206, and ultimately to the Command, Control and Dispatch center 207.

Figure 3:
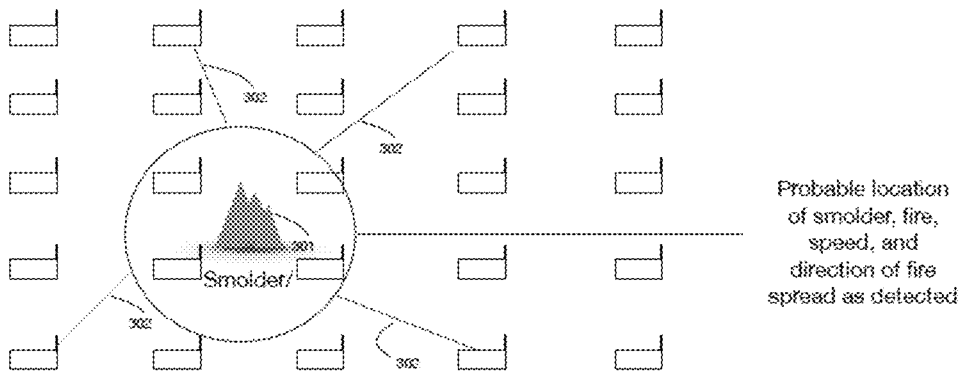
FIG. 3 is a Graphic Representation of each Wildfire station method of detection and locating smoke, smolder, or flame; and triangulation of the smolder, smoke, flame, the direction of the burn and the speed of the burn.

FIG. 3 is a graphic representation of a Wildfire station array. The placement of the Wildfire stations are at the discretion of the authority having jurisdiction of the forest, land, and wilderness management. Ideally, the Wildfire stations should be placed at every acre, and on any building or structure in the area to be monitored, and closer in areas that are more fire prone.

This dawn is a sample of the placement on a grid system that is being monitored of by the Wildfire station 301. A smolder 301 has been detected and an early warning to the Command, Control and Dispatch center. The ring of smoke 302 can be triangulated to determine location of the burn, direction of the burn, and speed of the burn. The Command and Control and Dispatch center can send immediate crew to remediate and extinguish the burn or send a single airplane water dump to extinguish the flame early before the forest catches fire and/or becomes a wildfire out of control.

The invention claimed are:

1. A wildfire detection system comprising:

at least one wildfire station comprising:

a four-sided louvered metal exterior enclosure to facilitate ambient air flow to detect flames, smoke, and heat;

an insect, animal, and debris barrier screen;

a solar panel positioned on a top portion of the system capable of charging a plurality of redundant batteries through a battery charger;

an ionization detection circuit board configured to detect flames;

a photoelectric detection circuit board configured to detect smoke;

a heat sensor;

a central processing unit (CPU) and alarm panel configured to monitor battery condition and send alarm signals;

a mini camera connected to the CPU and alarm panel, wherein the mini camera is provided for visual verification and remote surveillance, wherein the wildlife detection system provides two forms of fire verification through visual by the mini camera and through a combination of the ionization detection circuit board, the photoelectric detection circuit board, and the heat sensor to detect combustive gases;

a telemetry/celemetry transmitter connected to the CPU and alarm panel for sending alarm signals; and an antenna associated with the telemetry/celemetry transmitter through which the alarm signals are sent;

a power distribution unit (PDU) that distributes power to the ionization detection circuit board, the photoelectric detection circuit board, and the heat sensor; and a command, control and dispatch computing device configured to receive a detection signal associated with flames, smoke, and/or heat from the at least one wildfire station, receive notifications of proximate location, and execute a remediation action, wherein the remediation activity is selected from one or more of the following:

dispatch a fire extinguishing crew or activate an aerial water dump, and wherein the system triangulates an exact location based on an area of concern with triangulation with probable location from the at least one wildfire station with an alarm status, showing direction and speed of the burn, and wherein the at least one wildfire station is mounted on a pole or tree.

2. The wildfire detection system of claim 1, wherein the system is deployable in rural areas, barns, remote buildings, and storage, grain storage, forest, woodlands, and/or wilderness.

3. The wildfire detection system of claim 1, wherein the screen is made of metal or synthetic materials.

4. A method for early warning wildfire detection and response, the method comprising:

deploying a plurality of wildfire stations in rural areas, barns, remote buildings and storage, grain storage, forest, woodlands, and/or wilderness, each of the plurality of wildfire stations comprising:

a four-sided louvered metal exterior enclosure to facilitate ambient air flow to detect flames, smoke, and heat;

an insect, animal, and debris barrier screen mesh;

a solar panel positioned on a top portion of the system capable of charging a set of redundant rechargeable batteries through a battery charger;

an ionization detection circuit board having an ion sensor capable of detecting ions from flames;

a photoelectric detection circuit board having one or more sensors capable of detecting smoke;

a heat sensor;

a central processing unit (CPU) and alarm panel capable of sending alarm signals; and a power distribution unit (PDU) that distributes power to the CPU and alarm panel to monitor battery condition, the ionization detection circuit board, the photoelectric detection circuit board, and the heat sensor;

using the plurality of wildfire stations, monitoring ambient air to detect smoke, flame, and/or heat in an area;

triangulating an exact location based on an area of concern with triangulation with probable location from the plurality of wildfire stations with an alarm status;

sending a detection signal associated with flames, smoke, and/or heat to a command, control and dispatch computing device capable of executing a remediation action, wherein the remediation action is selected from one or more of the following:

dispatch a fire extinguishing crew or activate an aerial water dump, wherein the plurality of wildfire stations are positioned in locations where sunlight is capable of reaching the solar panel.

5. The method of claim 4 further comprising:

using a mini camera within the plurality of wildfire stations, conducting visual verification and/or remote surveillance.

6. The method of claim 4, the plurality of wildfire stations further comprising:

a telemetry/celemetry transmitter connected to the CPU and alarm panel for sending alarm signals; and an antenna associated with the telemetry/celemetry transmitter through which the alarm signals are sent.

* * * * *